(12) United States Patent
Dyer et al.

(10) Patent No.: US 11,498,690 B2
(45) Date of Patent: Nov. 15, 2022

(54) ELECTRONIC RELEASE SYSTEM FOR A HOLD OPEN ROD MECHANISM

(71) Applicant: MarathonNorco Aerospace, Inc., Waco, TX (US)

(72) Inventors: Ben Dyer, Waco, TX (US); Jason Roth, Waco, TX (US); Del Latham, Waco, TX (US)

(73) Assignee: MARATHONNORCO AEROSPACE, INC., Waco, TX (US)

(\*) Notice: Subject to any disclaimer, the term of this patent is extended or adjusted under 35 U.S.C. 154(b) by 382 days.

(21) Appl. No.: 16/571,386

(22) Filed: Sep. 16, 2019

(65) Prior Publication Data

US 2020/0087001 A1      Mar. 19, 2020

Related U.S. Application Data

(60) Provisional application No. 62/731,634, filed on Sep. 14, 2018.

(51) Int. Cl.
*B64D 29/06* (2006.01)
*F16H 25/24* (2006.01)
*E05B 47/00* (2006.01)

(52) U.S. Cl.
CPC .......... *B64D 29/06* (2013.01); *E05B 47/0002* (2013.01); *F16H 25/2454* (2013.01); *E05B 2047/0074* (2013.01)

(58) Field of Classification Search
CPC .......... E05C 17/30; E05C 17/04; E05C 17/00; E05C 17/12; E05C 17/58; B64D 29/06; B64C 1/1446; B64C 1/14; B64C 7/00; B64C 7/02; B64C 1/1415; E05Y 2201/264; E05Y 2900/502; E05B 55/005; E05B 47/0002; E05B 2047/0074; F16H 25/2454
See application file for complete search history.

(56) References Cited

U.S. PATENT DOCUMENTS

| 8,286,518 | B2\* | 10/2012 | Boehen | E05F 15/622 74/89.23 |
|---|---|---|---|---|
| 8,615,846 | B2 | 12/2013 | Wheeler et al. | |
| 8,844,895 | B2 | 9/2014 | Palma et al. | |
| 8,998,165 | B2 | 4/2015 | Wheeler et al. | |
| 9,067,669 | B2 | 6/2015 | Wheeler et al. | |
| 9,464,645 | B2 | 10/2016 | Dyer et al. | |
| 9,599,137 | B2 | 3/2017 | Wheeler et al. | |
| 10,683,880 | B2\* | 6/2020 | Fenn | F15B 15/14 |

(Continued)

*Primary Examiner* — Mark A Williams
(74) *Attorney, Agent, or Firm* — BakerHostetler

(57) ABSTRACT

An electronic release system configured to unlock a hold open rod mechanism or latch mechanism includes an actuator interface configured with an input device and an actuator associated with the hold open rod mechanism or the latch mechanism. The input device configured to be actuated by personnel to initiate operation of an unlocking mechanism associated with the hold open rod mechanism or the latch mechanism. The electronic release system also includes a wiring assembly configured to connect the actuator interface to the actuator. The actuator interface configured to determine actuation of the input device and signal the actuator over the wiring assembly. The actuator being configured to operate the unlocking mechanism associated with the hold open rod mechanism or the latch mechanism.

19 Claims, 7 Drawing Sheets

(56) References Cited

U.S. PATENT DOCUMENTS

| | | | | |
|---|---|---|---|---|
| 2009/0273419 | A1* | 11/2009 | Mitlmeier | H01H 89/06 335/127 |
| 2010/0024161 | A1* | 2/2010 | Wood | E05C 17/30 16/82 |
| 2011/0315822 | A1* | 12/2011 | Fairchild | B66B 13/08 244/129.5 |
| 2013/0206955 | A1* | 8/2013 | Palma | E05C 17/30 248/602 |
| 2015/0267724 | A1* | 9/2015 | Dyer | B64D 29/06 92/15 |
| 2016/0025199 | A1* | 1/2016 | Boone | B64C 13/50 74/89.38 |
| 2016/0069118 | A1* | 3/2016 | Artin | B64D 29/06 16/85 |
| 2016/0195115 | A1* | 7/2016 | Fenn | B64C 25/30 92/82 |
| 2016/0264249 | A1* | 9/2016 | Lozano | B64D 29/08 |
| 2018/0223572 | A1* | 8/2018 | Artin | B64D 29/08 |
| 2020/0018096 | A1* | 1/2020 | Dyer | E05C 17/04 |

* cited by examiner

ELECTRONIC RELEASE SYSTEM FOR A HOLD OPEN ROD MECHANISM

CROSS-REFERENCE TO RELATED APPLICATIONS

This application claims the benefit of U.S. Provisional Application No. 62/731,634 filed on Sep. 14, 2018, which is hereby incorporated by reference in its entirety for all purposes as if fully set forth herein.

FIELD OF THE DISCLOSURE

The disclosure relates to a remotely operated electronic release system for a hold open rod mechanism. The disclosure also relates to a remotely operated electronic release system for a latch mechanism.

BACKGROUND OF THE DISCLOSURE

Hold open rods are well known in both the automotive and aviation industries. Hold open rods may be used to hold a component, such as door or hatch, open after the component has been opened manually or automatically. Generally, hold open rods may include two cylindrical, telescoping tubes with an inner tube located inside of an outer tube. Alternatively, hold open rods may include two tubes having a square cross-section, hexagonal cross-section, or the like. In one aspect, a stowed position may be where the inner tube is extended a fraction of the fully extended length from the outer tube. In one aspect, a stowed position may be where the inner tube is extended a large fraction of the fully extended length from the outer tube. In one aspect, a stowed position may be where the inner tube is located almost entirely within the outer tube. When in use, the inner tube may be extended to a designated position in order to hold open the component. In the extended position, the tubes may be locked in place in order to hold the component open with a lock mechanism. The lock mechanism may be used to prevent the inner tube from retracting into the outer tube. A typical hold open rod supports a considerable amount of weight when locked in an open position. Once unlocked, the typical hold open rod allows movement of the component to a closed position.

In some implementations, the hold open rod is configured to hold open a component of considerable size. Moreover, the considerable size of the component places at least portions of the hold open rod at an elevated position that likewise elevates the position of a corresponding unlocking mechanism. The typical unlocking mechanism needs to be directly operated by personnel to unlock the hold open rod. The elevated position of the unlocking mechanism makes it difficult for personnel to reach and operate the unlocking mechanism. Typically, personnel will need to mount a ladder or other structure to reach the unlocking mechanism, which creates a safety hazard for operation of the unlocking mechanism. Moreover, it slows the process of operating the unlocking mechanism to place the component in the closed position.

Accordingly, it is desirable to have a hold open rod with a mechanism that allows personnel to remotely operate the unlocking mechanism.

SUMMARY OF THE DISCLOSURE

One general aspect includes an electronic release system configured to unlock a hold open rod mechanism or latch mechanism, including: an actuator interface configured with an input device; an actuator being associated with the hold open rod mechanism or the latch mechanism; the input device configured to be actuated by personnel to initiate operation of an unlocking mechanism associated with the hold open rod mechanism or the latch mechanism; a wiring assembly configured to connect the actuator interface to the actuator; the actuator interface configured to determine actuation of the input device and signal the actuator over the wiring assembly; the actuator being configured to operate the unlocking mechanism associated with the hold open rod mechanism or the latch mechanism; and the actuator including at least one of the following: a motor or a solenoid.

Implementations may include one or more of the following features. The electronic release system according further including: a linkage connecting the actuator to the unlocking mechanism, the linkage being responsive to the actuator to operate the unlocking mechanism associated with the hold open rod mechanism or the latch mechanism. The electronic release system may also include where the actuator includes the solenoid; and where the linkage includes at least one of the following: a gear, a lever, a gear train, and a cable. The electronic release system further including: an output device configured to output a status of at least one of the following: the motor, the solenoid, the hold open rod mechanism, or the latch mechanism; and at least one sensor configured to sense a position of at least one of the following: the motor, the solenoid, the hold open rod mechanism, or the latch mechanism. The electronic release system further including: a housing configured to house the actuator. The electronic release system may also include a housing configured to house the actuator interface. The electronic release system further including: a linkage connecting the actuator to the unlocking mechanism, the linkage being responsive to the actuator to operate the unlocking mechanism associated with the hold open rod mechanism or the latch mechanism. The electronic release system may also include where the actuator interface is configured to be arranged at a first elevation. The electronic release system may also include where the hold open rod mechanism or the latch mechanism are configured to be arranged at a second elevation. The electronic release system may also include where the second elevation is vertically higher than the first elevation; and where the linkage includes at least one of the following: a gear, a lever, a gear train, and a cable. The electronic release system where the actuator further includes a transmission to amplify a force/torque of the actuator to operate the unlocking mechanism associated with the hold open rod mechanism or the latch mechanism, where the transmission includes at least one of the following: a leadscrew, a screw jack, a ball screw, and a roller screw. The electronic release system where the actuator further includes a transmission to amplify a force/torque of the actuator to operate the unlocking mechanism associated with the hold open rod mechanism or the latch mechanism. The electronic release system may also include where the transmission includes an impacting mechanism. An aircraft system including the electronic release system and the hold open rod mechanism, the hold open rod mechanism including: an inner tube assembly coupled to an outer tube assembly, the inner tube assembly movable within the outer tube assembly. The aircraft system implemented with the hold open rod further including: a collar having a lock groove and unlock groove, and a locking dog configured to engage the unlock groove when the hold open rod is in an unlocked configuration and the locking dog further configured to engage the lock groove when the hold open rod is in a locked configuration. A movable aircraft structure including the hold open rod.

One general aspect includes an electronic release system configured to unlock a hold open rod mechanism or latch mechanism, including: an actuator interface configured with an input device; an actuator being associated with the hold open rod mechanism or the latch mechanism; the input device configured to be actuated by personnel to initiate operation of an unlocking mechanism associated with the hold open rod mechanism or the latch mechanism; a wiring assembly configured to connect the actuator interface to the actuator; the actuator interface configured to determine actuation of the input device and signal the actuator over the wiring assembly; the actuator being configured to operate the unlocking mechanism associated with the hold open rod mechanism or the latch mechanism; the actuator including at least one of the following: a motor or a solenoid; and at least one sensor configured to sense a position of at least one of the following: the motor, the solenoid, the hold open rod mechanism, or the latch mechanism.

Implementations may include one or more of the following features. The electronic release system further including: a linkage connecting the actuator to the unlocking mechanism, the linkage being responsive to the actuator to operate the unlocking mechanism associated with the hold open rod mechanism or the latch mechanism. The electronic release system may also include where the actuator includes the solenoid; and where the linkage includes at least one of the following: a gear, a lever, a gear train, and a cable. The electronic release system further including: an output device configured to output a status of at least one of the following: the motor, the solenoid, the hold open rod mechanism, or the latch mechanism. The electronic release system further including: a housing configured to house the actuator. The electronic release system may also include a housing configured to house the actuator interface. The electronic release system further including: a linkage connecting the actuator to the unlocking mechanism, the linkage being responsive to the actuator to operate the unlocking mechanism associated with the hold open rod mechanism or the latch mechanism. The electronic release system may also include where the actuator interface is configured to be arranged at a first elevation. The electronic release system may also include where the hold open rod mechanism or the latch mechanism are configured to be arranged at a second elevation. The electronic release system may also include where the second elevation is vertically higher than the first elevation. The electronic release system where the actuator further includes a transmission to amplify a force/torque of the actuator to operate the unlocking mechanism associated with the hold open rod mechanism or the latch mechanism, where the transmission includes at least one of the following: a leadscrew, a screw jack, a ball screw, and a roller screw. The electronic release system where the actuator further includes a transmission to amplify a force/torque of the actuator to operate the unlocking mechanism associated with the hold open rod mechanism or the latch mechanism. The electronic release system may also include where the transmission includes an impacting mechanism. An aircraft system including the electronic release system and the hold open rod mechanism, the hold open rod mechanism including: an inner tube assembly coupled to an outer tube assembly, the inner tube assembly movable within the outer tube assembly. The aircraft system implemented with the hold open rod further including: a collar having a lock groove and unlock groove, and a locking dog configured to engage the unlock groove when the hold open rod is in an unlocked configuration and the locking dog further configured to engage the lock groove when the hold open rod is in a locked configuration. A movable aircraft structure including the hold open rod.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
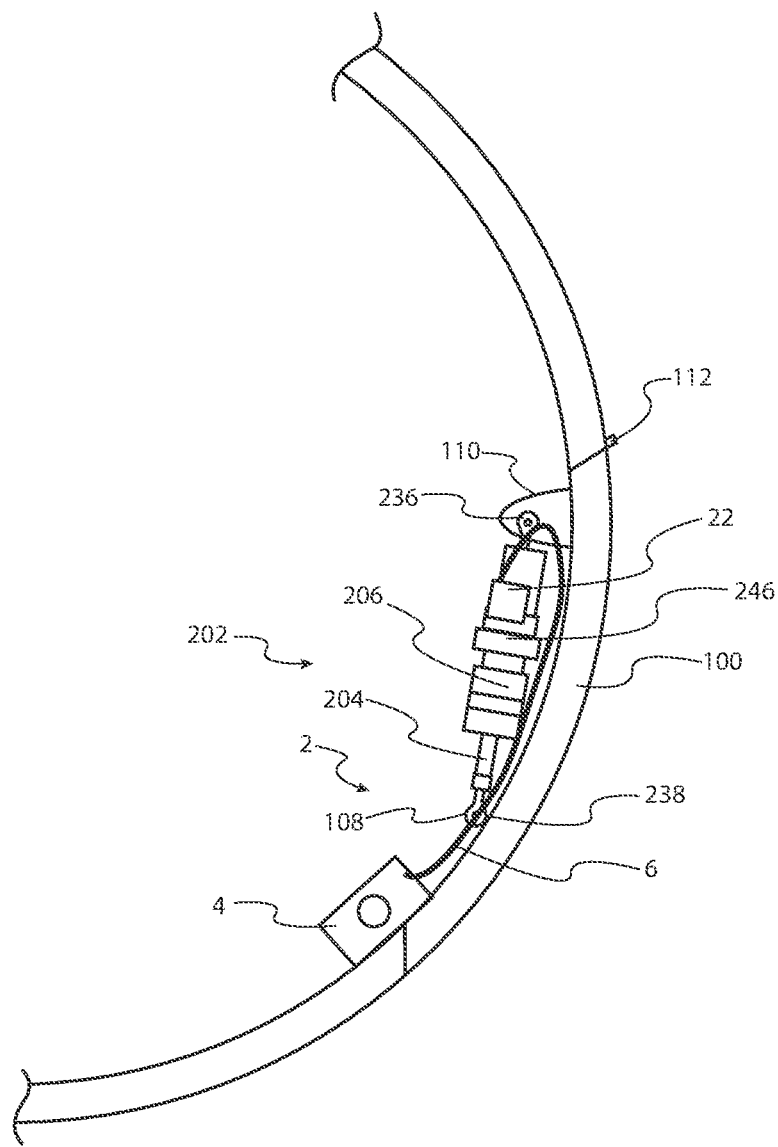
FIG. 1 illustrates a cross-sectional view of an electronic release system with a hold open rod implemented with a door in a closed configuration according to one aspect of the disclosure.

The disclosure will now be described with reference to the drawing figures, in which like reference numerals refer to like parts throughout. Various aspects of the disclosure advantageously provide an electronic release system for a hold open rod mechanism. Various aspects of the disclosure advantageously also provide an electronic release system for a latch mechanism. Various aspects of the disclosure advantageously also provide an electronic release system for other mechanisms. However, for brevity of disclosure, the implementation of the electronic release system utilized in a hold open rod will be discussed in detail. However, it is contemplated that the disclosed electronic release system may likewise be utilized to remotely operate a latch mechanism or other mechanisms.

FIG. 1 illustrates a cross-sectional view of an electronic release system with a hold open rod implemented with a door in a closed configuration according to one aspect of the disclosure.

In particular, FIG. 1 is a cross-sectional view illustrating a door 100, hatch, etc. in a closed configuration suitable for use with a hold open rod 202 according to an aspect of the disclosure. The door 100 may be located in a vehicle such as an aircraft, bus, ship, train, or the like. As illustrated in FIG. 1, the door 100 may be located in a fuselage of an aircraft. In other aspects, the door 100 may be an access panel, a radome door, a cover, a cowling, etc. for an engine nacelle, luggage compartment, or other compartment in an aircraft, vehicle, etc. In addition, the hold open rod 202 may be used in other structures such as buildings for holding open a door, a cover, a cowling, a hatch, and/or the like associated with the building. However, due to the advantageous reduction in weight and ease of maintenance, the hold open rod 202 may be particularly useful in aircraft and other types of vehicles. The hold open rod 202 may be made from various metallic materials such as aluminum, steel, titanium, and the like. Moreover, the hold open rod 202 may be formed of non-metallic materials such as Kevlar, carbon fiber, fiberglass, various resins, a polyamide material, including aliphatic polyamides, polypthalamides, aromatic polyamides, carbon fiberglass, another type of thermoplastic compound, and the like. Implementation using nonmetallic materials may be preferable in some areas such as a radome to avoid interference with transmission and reception of an associated radar or other radio frequency transmission device.

The hold open rod 202 may include an inner tube 204 and an outer tube 206. The inner tube 204 and outer tube 206 may be in axial alignment and slidable relative to one another in a telescoping manner. The inner tube 204 of the hold open rod 202 may be attached to the door 100 with a rod end 238 that pivotally connects to a door fitting 108 or other aircraft component. The hold open rod 202 may be attached to the fuselage, engine nacelle, etc. by a bracket 110 or other aircraft component that is connected to a rod end 236 of the outer tube 206. A converse attachment orientation is also contemplated by the disclosure. In further aspects, the hold open rod 202 may include one or more components to provide damping for the movement of the inner tube 204 into the outer tube 206. In further aspects, the hold open rod 202 may include the inner tube 204, the outer tube 206, and one or more additional tubes that may be in axial alignment and slidable relative to one another in a telescoping manner.

FIG. 1 further illustrates the electronic release system 2. The electronic release system 2 may be configured to actuate an unlocking mechanism (e.g., outer collar assembly 246) associated with the hold open rod 202. In prior art implementations, personnel needed to directly interact with the hold open rod 202 and, in particular, the unlocking mechanism associated with the hold open rod 202 in order to unlock the hold open rod 202. In yet other prior art implementations, personnel needed to directly interact with mechanical cable-based systems connected to the unlocking mechanism of the hold open rod 202 in order to unlock the hold open rod 202. The electronic release system 2 may be configured to operate the unlocking mechanism of the hold open rod 202 without the need to directly interact with the unlocking mechanism of the hold open rod 202 or interact with mechanical cable-based systems connected to the unlocking mechanism of the hold open rod 202. In one aspect, the electronic release system 2 may include an actuator interface 4, an actuator 22, and a wiring assembly 6 that connects the actuator interface 4 to the actuator 22 to operate the unlocking mechanism. In another aspect, the electronic release system 2 may include an actuator interface 4, an actuator 22, a wiring assembly 6 that connects the actuator interface 4 to the actuator 22, and a mechanical cable assembly associated with the actuator 22 to operate the unlocking mechanism.

The actuator interface 4 may be located externally to a vehicle (not shown) or may be located internally to a vehicle as illustrated in FIG. 1. Moreover, the actuator interface 4 may be located vertically lower than the hold open rod 202 in order to make it more easily accessible by personnel. In particular, the actuator interface 4 may be positioned such that personnel standing on ground level may operate the actuator interface 4 for operation of the actuator 22 for actuation of the unlocking mechanism of the hold open rod 202. As illustrated in FIG. 1, the actuator interface 4 is located vertically below the hold open rod 202. In one aspect, the actuator interface 4 is located at a first vertical position, the hold open rod 202 is located at a second vertical position, the first vertical position being vertically lower than the second vertical position. In one aspect, the actuator interface 4 is located at a first vertical position, a lock mechanism of the hold open rod 202 located at a second vertical position, the first vertical position being vertically lower than the second vertical position.

The electronic release system 2 may further include the wiring assembly 6 that may extend from the actuator interface 4 to the actuator 22 of the hold open rod 202. Moreover, the wiring assembly 6 may extend from the actuator interface 4 to the actuator 22 for controlling operation of the actuator 22 for actuating the unlocking mechanism of the hold open rod 202. In this regard, the wiring assembly 6 may connect to the actuator interface 4 and the actuator 22. In one aspect, the actuator 22 may interact with and move the unlocking mechanism from a non-unlocking position to an unlocking position. In other words, movement of the actuator 22 actuates the unlocking mechanism (the outer collar assembly 246) to unlock in response to operation by personnel of the actuator interface 4. This prevents undesired unlocking until actuated. In another aspect, the actuator 22 may interact with and move the unlocking mechanism from an unlocking position to a locking position. In other words, movement of the actuator 22 actuates the unlocking mechanism (the outer collar assembly 246) to lock in response to operation by personnel of the actuator interface 4. This prevents undesired locking. In one aspect, the actuator 22 may be configured to default to a locked configuration.

The wiring assembly 6 may be configured as an assembly of electrical cables or wires that may transmit signals or electrical power. The wiring assembly 6 may be bound together by straps, cable ties, cable lacing, sleeves, shielding, electrical tape, conduit, a weave of extruded string, or a combination thereof. The wiring assembly 6 may be fitted with terminals, connector housings, protective sleeves, and the like.

In one aspect, the electronic release system 2 may be configured such that operation of the actuator interface 4 by personnel may generate control signals transmitted over the wiring assembly 6 and sent to the actuator 22. Subsequently the actuator 22 may move the unlocking mechanism of the hold open rod 202 to an unlocking position. In other words, operating the actuator interface 4 unlocks the hold open rod 202. In another aspect, the electronic release system 2 may be configured such that operation of the actuator interface 4 by personnel may generate control signals transmitted over the wiring assembly 6 and sent to the actuator 22. Subsequently the actuator 22 may move the unlocking mechanism of the hold open rod 202 to a locking position. In other words, operating the actuator interface 4 locks the hold open rod 202.

Figure 2:
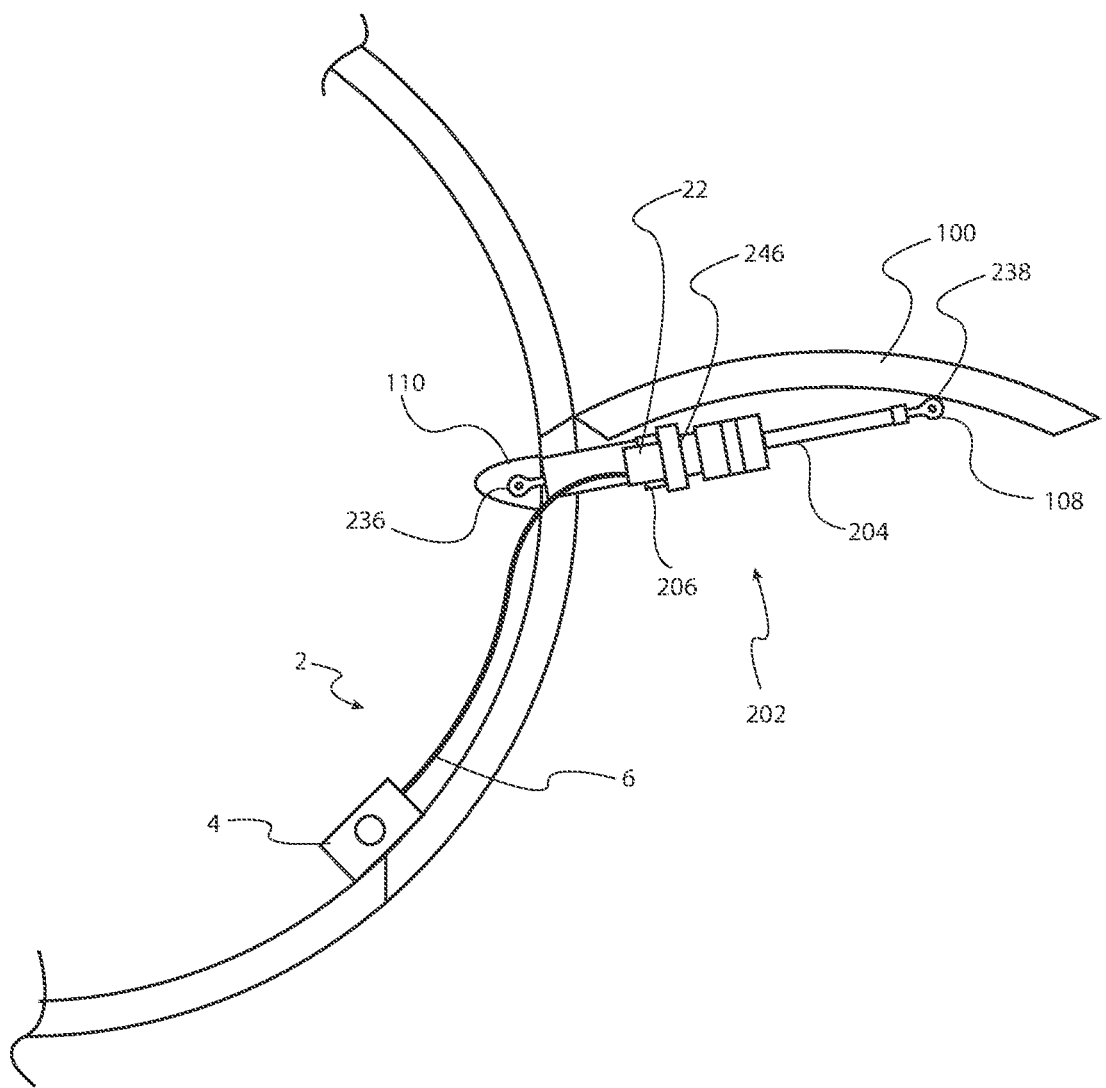
FIG. 2 illustrates a cross-sectional view of an electronic release system with a hold open rod implemented with a door in an open configuration according to one aspect of the disclosure.

FIG. 2 illustrates a cross-sectional view of an electronic release system with a hold open rod implemented with a door in an open configuration according to one aspect of the disclosure.

As shown in FIG. 2, the door 100 may swing open and upwards via a hinge 112 or similar structure allowing movement of the door 100. Other movements of the door 100 are contemplated as well. In response to the door 100 being opened, the inner tube 204 may telescope out from the outer tube 206. In the aspect illustrated in FIG. 2, the door 100 is configured to close at least by gravity acting on the door 100. In one aspect, the hold open rod 202 maintains the door 100 in an open position with a lock providing resistance on the inner tube 204 to prevent the inner tube 204 from sliding into the outer tube 206. In one aspect, the hold open rod 202 maintains the door 100 in an open position with a lock that prevents movement of the inner tube 204 from sliding into the outer tube 206.

FIG. 2 further illustrates that the elevated position of the door 100 likewise elevates the position of the hold open rod 202. The unlocking mechanism of the hold open rod 202 is likewise elevated. Accordingly, the operation of the unlocking mechanism may be more difficult for personnel to operate and/or reach easily. On the other hand, as further illustrated in FIG. 2, the electronic release system 2 and, in particular, the actuator interface 4 may be vertically located lower than the hold open rod 202. Accordingly, personnel can more easily operate the actuator interface 4, that controls the actuator 22 to operate the unlocking mechanism such that the hold open rod 202 may be unlocked to allow the door 100 to move back to a closed position (as illustrated in FIG. 1).

Figure 3:
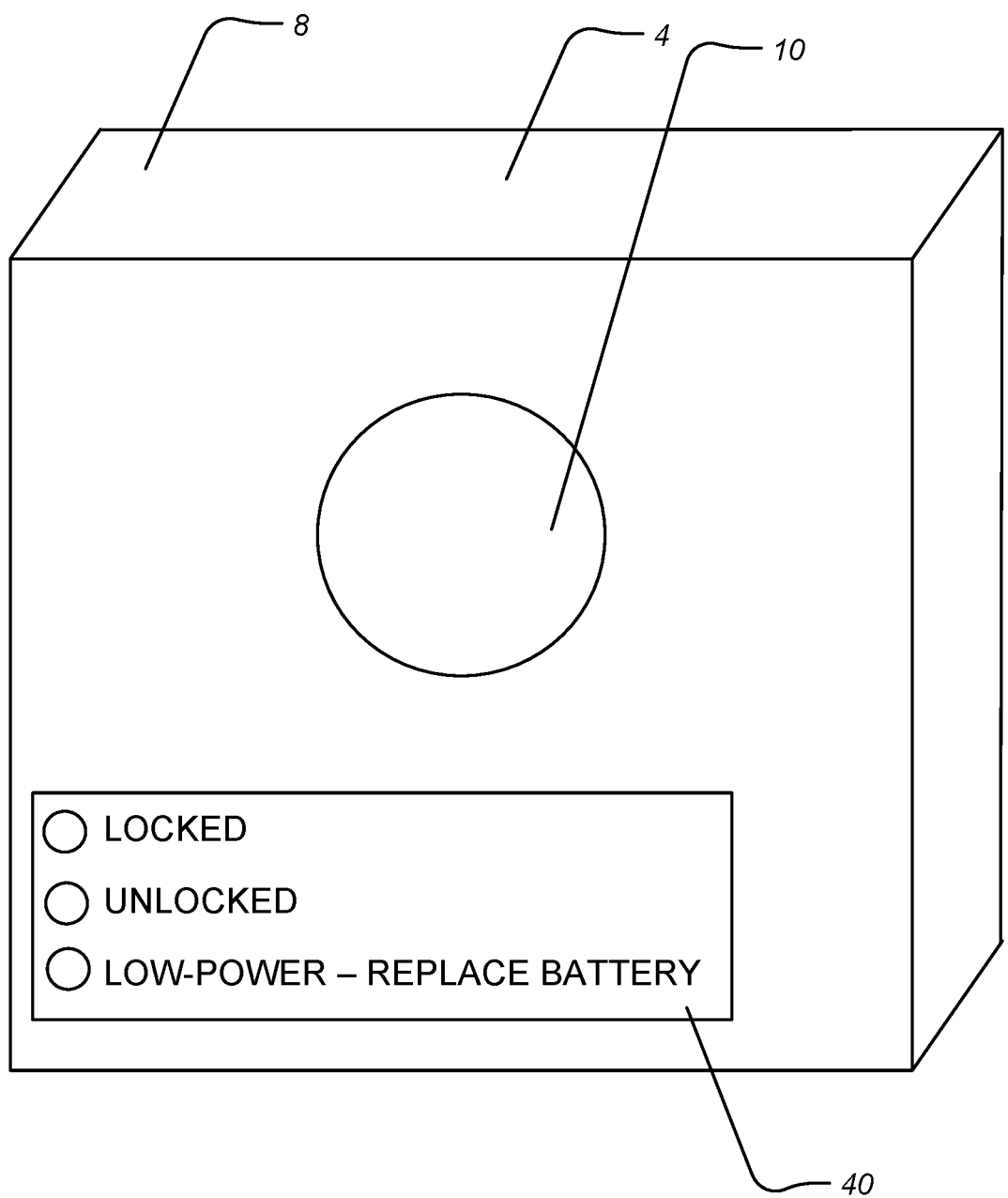
FIG. 3 illustrates a front perspective view of an actuator interface of the electronic release mechanism according to one aspect of the disclosure.

FIG. 3 illustrates a front perspective view of an actuator interface of the electronic release mechanism according to one aspect of the disclosure.

In particular, FIG. 3 illustrates the actuator interface 4. The actuator interface 4 may be configured with an input device 10 to receive an input from personnel to operate the electronic release system 2, and in particular, the actuator 22, to unlock the hold open rod 202. In one aspect, the input device 10 may be a mechanical switch. In some aspects, the input device may be a manually operated electromechanical device with one or more sets of electrical contacts. Each set of contacts can be in one of two states: either "closed" meaning the contacts are touching and electricity can flow between them, or "open," meaning the contacts are separated and the switch is non-conducting. The mechanism actuating the transition between these two states (open or closed) may be either an "alternate action" (flip switch for continuous "on" or "off") or "momentary" (push for "on" and release for "off") type switch. The input device 10 may be configured with a circuit to reduce contact bounce. In one aspect, the circuit to reduce contact bounce may be a low-pass filter to reduce or eliminate multiple pulses. In one aspect, the circuit to reduce contact bounce may include taking multiple samples of the contact state at a low rate that are examined for a steady sequence. In one aspect, the circuit to reduce contact bounce may be configured to receive signals to be filtered out using a SR flip-flop (latch), Schmitt trigger, or the like.

The input device 10 may be configured with an actuator that includes a moving part that applies the operating force to the contacts and may be implemented as a toggle, dolly, a rocker, a push-button, a rotary switch, a keyed switch, any type of mechanical linkage, and/or the like.

As shown in FIG. 3, the input device 10 is a button. The input device may be arranged in a housing 8. In one aspect, the input device implemented as a button that may have a surface that is flush or recessed with respect to a surface of the housing 8 to avoid inadvertent operation of the input device 10. In other words, the surface of the button may be flush with the surface of the housing 8 or the surface of the button may be recessed into the surface of the housing 8. Accordingly, actuation of the button may require personnel to press the button into the housing 8. Of course, other implementations are contemplated as well. Moreover, the housing 8 may further house any of the components of the actuator interface 4.

The housing 8 may be implemented as a protective case for the actuator interface 4. In one aspect, the housing 8 may be hermetically sealed to prevent intrusion of foreign objects, liquids, and the like. In one aspect, the housing 8 may be waterproof, watertight, and/or water resistant to prevent intrusion of water and other liquids present in the environment of the housing 8 and the vehicle. In this regard, the housing 8 may include one or more seals, gaskets, adhesives, waterproof coatings, potting materials, and the like. These aspects may be implemented for applications in extreme outdoor environments for protection of the actuator interface 4.

The actuator interface 4 may further include an output device 40. The output device 40 may include any type of output including lights, sounds, alphanumeric display, and the like. As shown by the exemplary implementation of the output device 40 in FIG. 3, the output device 40 includes lights indicating a locked configuration of the hold open rod 202, an unlocked configuration of the hold open rod 202, a low-power condition of the actuator interface 4, a low-power condition of the actuator 22, a low-power condition of a power supply of the actuator interface 4, a low-power condition of a power supply of the actuator 22, or the like.

Figure 4:
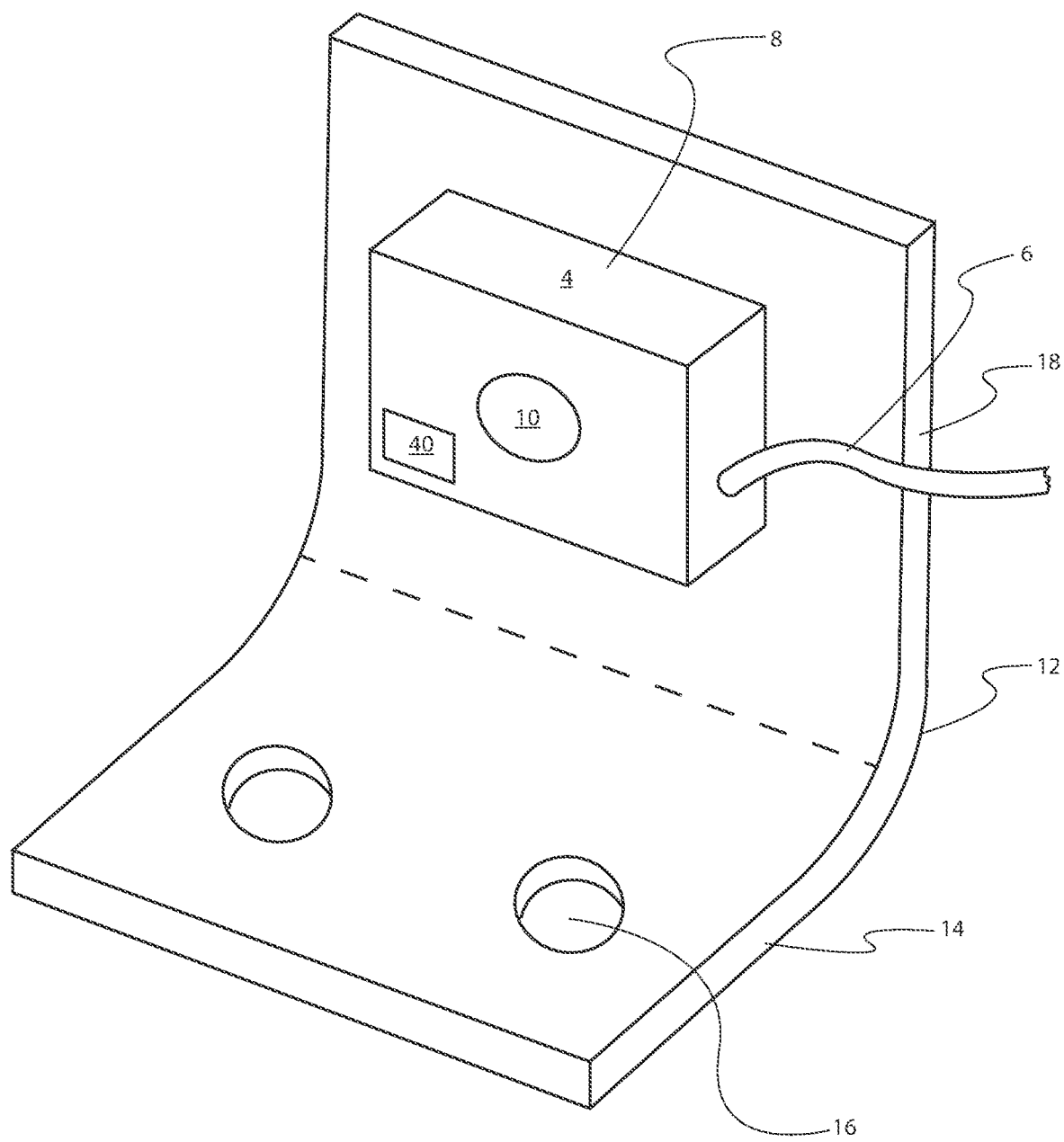
FIG. 4 illustrates a front perspective view of an actuator interface of the electronic release mechanism according to one aspect of the disclosure.

FIG. 4 illustrates a front perspective view of an actuator interface of the electronic release mechanism according to one aspect of the disclosure.

In particular, as illustrated in FIG. 4 the actuator interface 4 may include a support such as bracket 12 or the like. The bracket 12 may be configured to mount the actuator interface 4 to a support structure such as an internal component of the vehicle, an external component of a vehicle, a hard point, a frame, or the like. In other aspects, the actuator interface 4 may not include a support or the bracket 12 and may otherwise be mounted to a support structure. In yet other aspects, the actuator interface 4 may not be mounted to a support structure and may be freely suspended. In further aspects, it is contemplated that any support may take any configuration to support the actuator interface 4.

In some aspects, the bracket 12 may include a mounting portion 14. The mounting portion 14 may be configured with mounting apertures 16 configured to receive a mechanical fastener to fasten the bracket 12 to the support structure. In some aspects, the bracket 12 may further include a support portion 18. The support portion 18 may be configured to support the remaining components of the actuator interface 4 including the housing 8. In one aspect, the bracket 12 may be configured with an L-shaped cross-section with a vertical portion of the L-shaped cross-section being the support portion 18 and the lower horizontal portion of the L-shaped cross-section being the mounting portion 14. In some aspects, the bracket 12 may further include connections for supporting one end of the wiring assembly 6.

Figure 5:
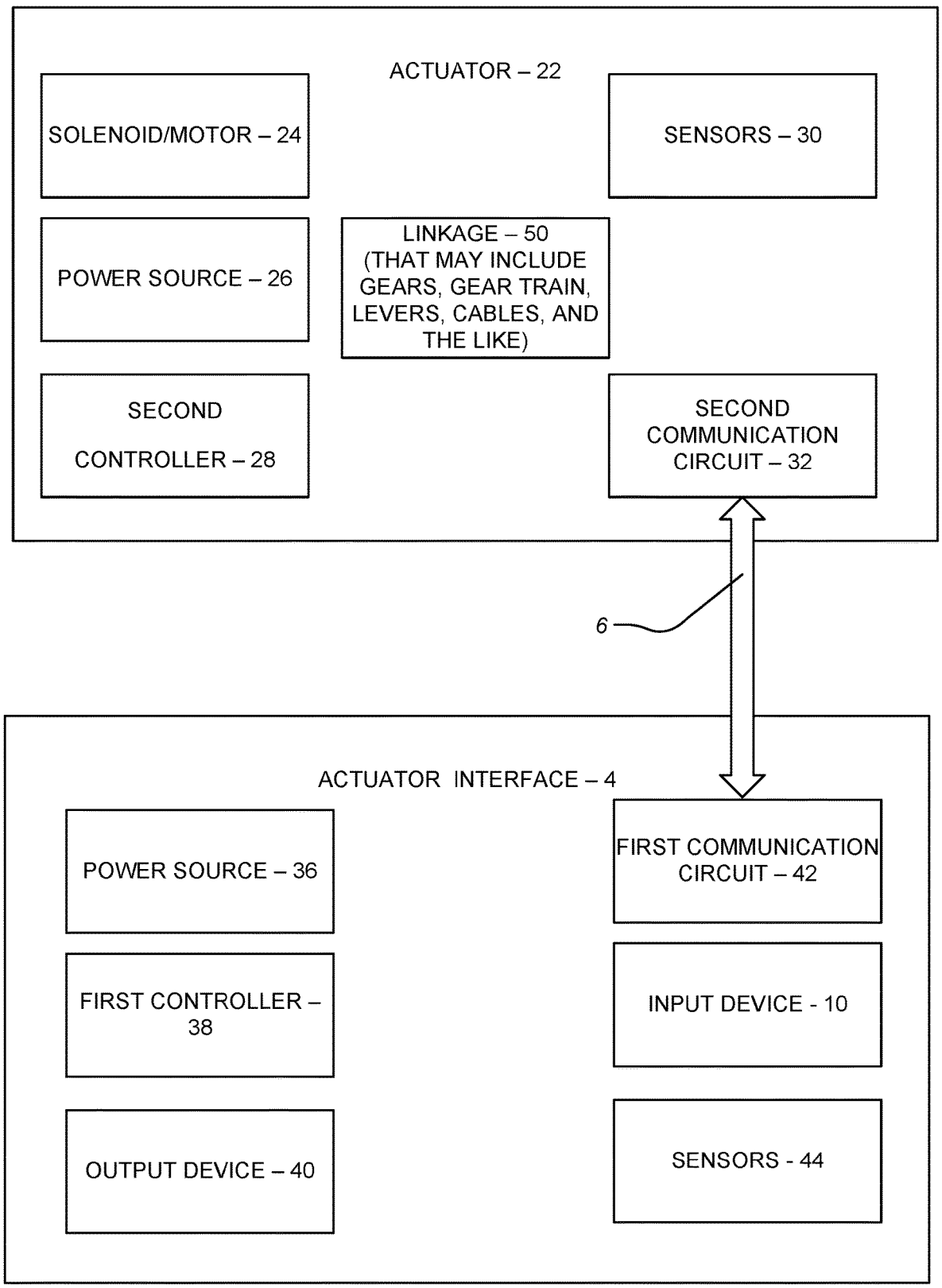
FIG. 5 illustrates a schematic of an electronic release mechanism according to one aspect of the disclosure.

FIG. 5 illustrates a schematic of an electronic release mechanism according to one aspect of the disclosure.

In particular, FIG. 5 schematically illustrates an exemplary construction of the actuator interface 4, the actuator 22, and the wiring assembly 6. As further illustrated in FIG. 5, the actuator interface 4 may include the input device 10 and the actuator 22 may include a solenoid/motor 24 having a linkage 50. The linkage 50 may include gears, levers, a gear train, a cable, or the like.

In operation, the electronic release system 2 may be configured to receive an input from personnel to unlock the hold open rod 202 by input to the input device 10. The actuator interface 4 may communicate the input received by the input device 10 over the wiring assembly 6 to the actuator 22. The actuator 22 may receive the input communication from the actuator interface 4 and control the solenoid/motor 24 to place the unlocking mechanism of the hold open rod 202 in the unlocked configuration.

In one aspect, the solenoid/motor 24 may be a solenoid that moves the unlocking mechanism of the hold open rod 202 from the locked configuration to the unlocked configuration. In one aspect, the solenoid may include a coil of wire wrapped around a soft iron core, an iron yoke, which provides a low reluctance path for magnetic flux, and a movable iron armature that may connect to a linkage that operates the unlocking mechanism. However, the solenoid may be implemented using any known technology including an electromechanical solenoid, rotary solenoid, rotary voice coil solenoid, and the like.

In one aspect, the solenoid/motor 24 may be a motor that moves the unlocking mechanism of the hold open rod 202 from the locked configuration to the unlocked configuration. In one or more aspects, the motor may include one or more of a rotor, bearings, stator, air gap, windings, commutator, and the like. In one or more aspects, the motor may be implemented as self-commutated motor, brushed DC, motor, electrically excited DC motor, permanent magnet DC motor, electronic commutator (EC) motor, brushless DC motor, switched reluctance motor, universal AC-DC motor, externally commutated AC machine, induction motor, cage and wound rotor induction motor, torque motor, synchronous motor, doubly-fed electric machine, or the like. In one or more aspects, the motor may include a transmission, a linkage, driveshafts, and the like that operate, in response to movement of the solenoid/motor 24, to move and control the unlocking mechanism. In some aspects, the transmission may be configured to amplify a torque/force of the solenoid/motor 24. In some aspects, the transmission may be configured to amplify a torque/force of the solenoid/motor 24 utilizing a mechanical linear actuator. The mechanical linear actuator may include a screw type mechanical linear actuator. The screw type mechanical linear actuator may be implemented as a leadscrew, a screw jack, a ball screw, a roller screw, or the like. In some aspects, the transmission may be configured as an impacting mechanism. The impacting mechanism may include a rotating mass that may be accelerated by the solenoid/motor 24 to store energy that is periodically connected to the output shaft to generate a high-torque impact.

The actuator 22 may be arranged in a housing. In one aspect, the housing that houses the actuator 22 may be attached to the hold open rod 202. In one aspect, the housing that houses the actuator 22 may be attached adjacent the hold open rod 202. In one aspect, the housing that houses the actuator 22 may be arranged externally to the hold open rod 202. In one aspect, the housing that houses the actuator 22 may be implemented internally to the hold open rod 202. The housing may be implemented as a protective case for the actuator 22. In one aspect, the housing may be hermetically sealed to prevent intrusion of foreign objects, liquids, and the like. In one aspect, the housing may be waterproof, watertight, and or water resistant to prevent intrusion of water and other liquids present in the environment of the housing and the vehicle. In this regard, the housing may include one or more seals, gaskets, adhesives, waterproof coatings, potting materials, and the like. These aspects may be implemented for applications in extreme outdoor environments for protection thereof.

The actuator interface 4 may further include a power source 36. The power source 36 may include one or more batteries, a power connection to an external power supply, a connection to a power source associated with the actuator 22, a power source associated with an aircraft, a power source associated with a building, and/or the like. The power source 36 may further include one or more circuits that may include one or more of a rectifier, a DC to DC converter, a transformer, a voltage regulator, fuses, a ground fault circuit interrupter, and/or the like to provide a steady, safe, and reliable source of power to the actuator interface 4. In one aspect, the power source 36 may be one or more batteries housed in the housing 8. In one aspect, the power source 36 may be one or more rechargeable batteries housed in the housing 8. In one aspect, the power source 36 may be one or more non-rechargeable batteries housed in the housing 8. In one aspect, the power source 36 may be configured to receive power from the wiring assembly 6 from a power source 26 located in the actuator 22. In one aspect, the power source 36 may be configured to receive power from the wiring assembly 6 from a power source associated with a vehicle that the actuator interface 4 is implemented.

The actuator 22 may further include a power source 26. The power source 26 may include one or more batteries, a power connection to an external power supply, a connection to a power source associated with the actuator interface 4, a power source associated with an aircraft, a power source associated with a building, and/or the like. The power source 26 may further include one or more circuits that may include one or more of a rectifier, a DC to DC converter, a transformer, a voltage regulator, fuses, a ground fault circuit interrupter, and/or the like to provide a steady, safe, and reliable source of power to the actuator 22. In one aspect, the power source 26 may be one or more batteries housed in the housing. In one aspect, the power source 26 may be one or more rechargeable batteries housed in the housing. In one aspect, the power source 26 may be one or more non-rechargeable batteries housed in the housing. In one aspect, the power source 26 may be configured to receive power from the wiring assembly 6 from a power source 26 located in the actuator interface 4. In one aspect, the power source 26 may be configured to receive power from the wiring assembly 6 from a power source associated with a vehicle that the actuator 22 is implemented.

The actuator interface 4 may further include a first controller 38. The first controller 38 may be configured to sense operation of the input device 10, configured to control operation of the output device 40, configured to control operation of the power source 36, control operation of a first communication circuit 42, receive sensor readings from a sensor 44, and the like. The first controller 38 may be implemented as a hardwired circuit, a processor, or the like. In some aspects, the first controller 38 may be implemented with software, a program, or the like to provide implementation of the features described in the disclosure. In some aspects, the first controller 38 may be a computing device as defined herein.

The actuator 22 may include a second controller 28. The second controller 28 may be configured to sense and control operation of the solenoid/motor 24, configured to sense operation of the power source 26, control operation of a second communication circuit 32, receive sensor readings from one or more sensors 30, and the like. The second controller 28 may be implemented as a hardwired circuit, a processor, or the like. In some aspects, the second controller 28 may be implemented with software, a program, or the like to provide implementation of the features described in the disclosure. In some aspects, the first controller 38 may be a computing device as defined herein.

In some aspects, the first controller 38 may be combined with the second controller 28. Accordingly, the functionality described herein may be implemented by the combined controller. The combined controller may be associated with the actuator 22 or the actuator interface 4. In some aspects, the combined controller may be a computing device as defined herein.

The first communication circuit 42 may be configured to connect to the wiring assembly 6 and transmit/receive communication signals with a second communication circuit 32. Likewise, the second communication circuit 32 may be configured to connect to the wiring assembly 6 and transmit/receive communication signals with a first communication circuit 42.

The actuator 22 may further include one or more sensors 30. The one or more sensors 30 may include an interlock to prevent unsafe unlocking and/or locking of the hold open rod 202. In some aspects, the interlock may operate based on a signal from an aircraft system. The sensors 30 may include a position sensor to determine a position of the solenoid/motor 24, a position of the hold open rod 202, the state of the lock mechanism (locked versus unlocked), or the like. The position sensor may be one or more of a capacitive transducer, capacitive displacement sensor, eddy-current sensor, grating sensor, hall effect sensor, inductive non-contact position sensors, linear variable differential transformer (LVDT), multi-axis displacement transducer, photodiode array, piezo-electric transducer (piezo-electric), potentiometer, proximity sensor (optical), rotary encoder (angular), string potentiometer, or the like. The sensors 30 may further include a voltage sensor to determine a voltage of the power source 26, a current sensor to determine a current of the power source 26, a temperature sensor to determine a temperature of the power source 26, and/or the like.

The actuator interface 4 may further include one or more sensors 44. The sensors 44 may include a voltage sensor to determine a voltage of the power source 36, a current sensor to determine a current of the power source 36, a temperature sensor to determine a temperature of the power source 36, and/or the like. The one or more sensors 44 may include an interlock to prevent unsafe unlocking and/or locking of the hold open rod 202. In some aspects, the interlock may operate based on a signal from an aircraft system.

In some aspects, the first controller 38 and/or the second controller 28 may be configured to control the solenoid/motor 24 based on output from the one or more sensors 30 that detects a position of the solenoid/motor 24. More specifically, the first controller 38 and/or the second controller 28 may determine an input to the input device 10 and signal the solenoid/motor 24 to operate. The first controller 38 and/or the second controller 28 may continue to signal the solenoid/motor 24 to operate until the output from the one or more sensors 30 detects a position of the solenoid/motor 24 that is indicative of the lock mechanism being in the unlocked state.

In another aspect, the first controller 38 and/or the second controller 28 may be configured to control the solenoid/motor 24 based on output from the one or more sensors 30 that detects a position of the unlocking mechanism. More specifically, the first controller 38 and/or the second controller 28 may determine an input to the input device 10 and signal the solenoid/motor 24 to operate. The first controller 38 and/or the second controller 28 may continue to signal the solenoid/motor 24 to operate until the output from the one or more sensors 30 detects a position of the unlocking mechanism that is indicative of the lock mechanism being in the unlocked state.

The output device 40 may be arranged in and/or on the housing 8 of the actuator interface 4. The output device 40 may output a status of the hold open rod 202. The status may include locked, unlocked, and the like. In one aspect, the output device 40 may include a light, such as a light emitting diode, indicating that the hold open rod 202 is locked. In one aspect, the output device 40 may include a light, such as a light emitting diode, indicating that the hold open rod 202 is unlocked. The lights may include various colors to indicate the status. For example, unlocked may include a red light and locked may include a green light indicative of the status.

The output device 40 may further include a status of the power source 26, the power source 36, or the like. For example, a light may indicate low-power, a light may indicate powered, and the like. In other aspects, the output device 40 may include an alphanumeric display providing the above-noted status information.

The output device 40 may output a status of the hold open rod 202 with a sound. The status may include locked, unlocked, and the like. In one aspect, the output device 40 may output a first sound indicating that the hold open rod 202 is locked. In one aspect, the output device 40 may output a second sound indicating that the hold open rod 202 is unlocked. For example, after pressing the input device 10, it may beneficial for the output device 40 to output a sound indicating that the door 100 may be closing and for personnel to step clear of the closing door. In one aspect, the output may be a verbal warning to step clear of the closing door. The verbal warning may be configured in one or more multiple languages.

In some aspects, the first controller 38 and/or the second controller 28 may include a timer and/or delay function. In this regard, after personnel have pressed the input device 10, it may beneficial the first controller 38 and/or the second controller 28 to delay operation of the actuator 22, and in particular the solenoid/motor 24, from unlocking the hold open rod 202 to allow time for personnel to step clear of the closing door 100.

The electronic release system 2 may be utilized in any type of hold open rod, latch mechanism, or the like that may benefit from a remote operation. One exemplary hold open rod that may utilize and benefit from the above disclosed electronic release system 2 is described below. However, numerous other hold open rod mechanisms and latch mechanisms are contemplated as well.

Figure 6:
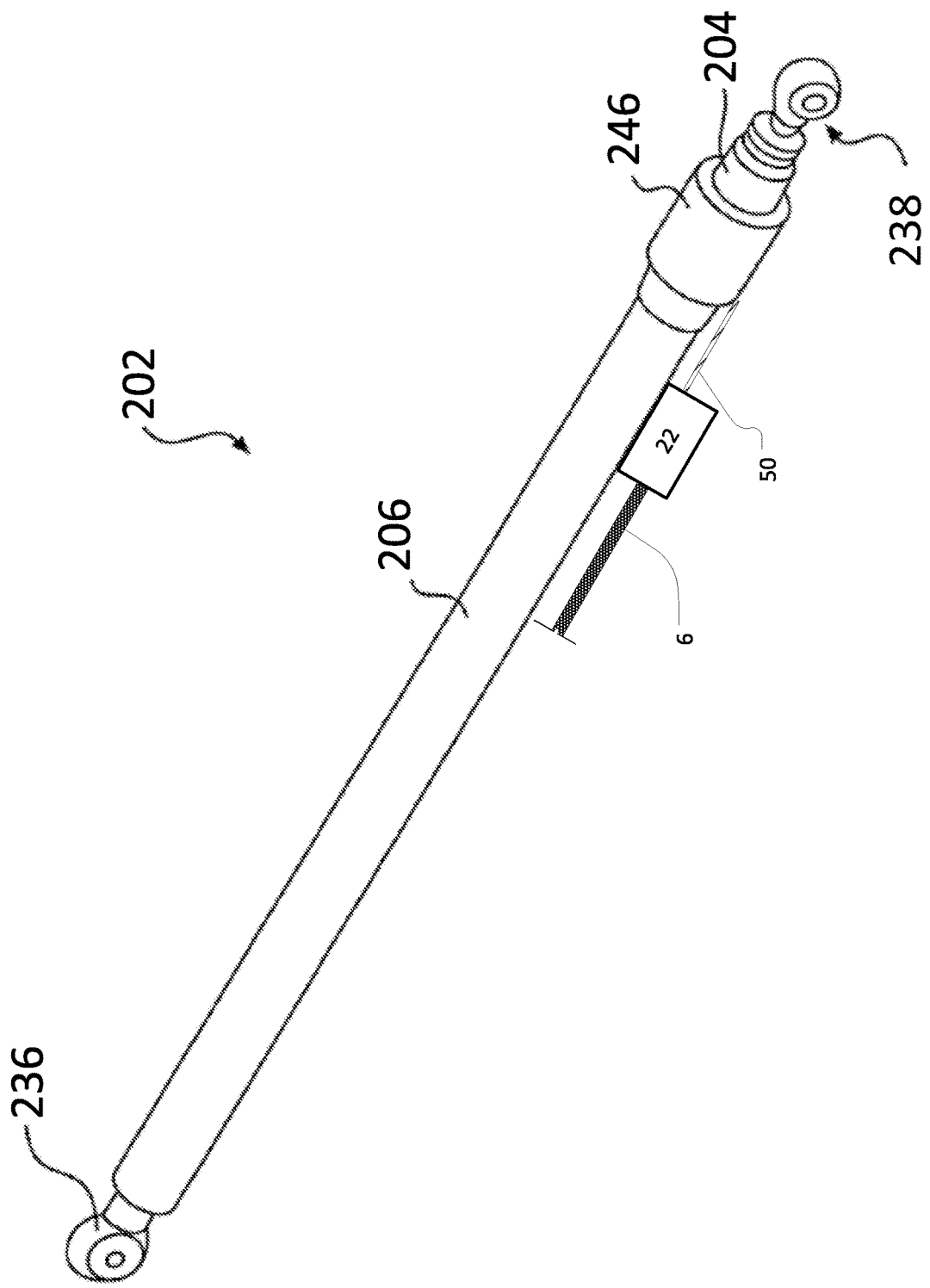
FIG. 6 is a perspective view of an exemplary hold open rod in accordance with an aspect of the disclosure.

FIG. 6 is a perspective view of an exemplary hold open rod in accordance with an aspect of the disclosure.

FIG. 6 illustrates a hold open rod 202 in accordance with an aspect of the disclosure. The hold open rod 202 includes an inner tube 204 that slides within an outer tube 206. The position of the hold open rod 202 shown in FIG. 6 is the stowed, also referred to as the rest, or retracted position. In this position, the inner tube 204 is substantially inside the outer tube 206.

The hold open rod 202 may be extended by sliding the inner tube 204 far enough out from the outer tube 206 to reach a desired length. The hold open rod 202 includes a rod end 236 and a rod end 238 to connect the hold open rod 202 to an object to which it will be mounted. For example, the rod end 236 and the rod end 238 may attach to a door or hatch on one side and on the other side to a frame of the door or hatch, thereby allowing the hold open rod 202 to hold the door or hatch in an open position. The hold open rod 202 can be allowed to selectively lock the inner tube 204 to the outer tube 206 in order to, for example, hold the door or the hatch in an open position. The locking of the hold open rod 202 may be accomplished by manipulation of an outer collar assembly 246.

When a hold open rod 202 is in a stowed position, as shown in FIG. 6, the door or hatch may likewise be in a closed position. Often, the stowed position is the position in which the hold open rod 202 spends a majority of its time.

In particular, FIG. 6 illustrates the hold open rod 202 and an outer collar assembly 246. The outer collar assembly 246 may be implemented as the unlocking mechanism. As further illustrated in FIG. 6, the wiring assembly 6 may be connected to the actuator 22. The actuator 22 may be engaged with the outer collar assembly 246 through a linkage 50 and movement of the linkage 50 in response to operation of the solenoid/motor 24 may place the outer collar assembly 246 in the unlocked position or the non-unlocked position. In some aspects, the linkage 50 may include one or more gears, a gear train, levers, cables, and the like. In one aspect, the linkage 50 may include a cable between the actuator 22 and the outer collar assembly 246. The cable may be implemented as a Bowden cable that may include a flexible cable to transmit mechanical force or energy by the movement of an inner cable relative to a hollow outer cable housing. The housing may include a composite construction with an inner lining, a longitudinally incompressible layer such as a helical winding or a sheaf of steel wire, and a protective outer covering. The linear movement of the inner cable may transmit a push/pull force to the unlocking mechanism of the hold open rod 202. Moreover, the cable may include one or more components configured for adjusting the cable tension using an inline hollow bolt, barrel adjuster, or the like. The components may be configured such that they lengthen or shorten the cable housing relative to a fixed anchor point. Lengthening the housing tightens the cable; and shortening the housing loosens the cable.

Figure 7:
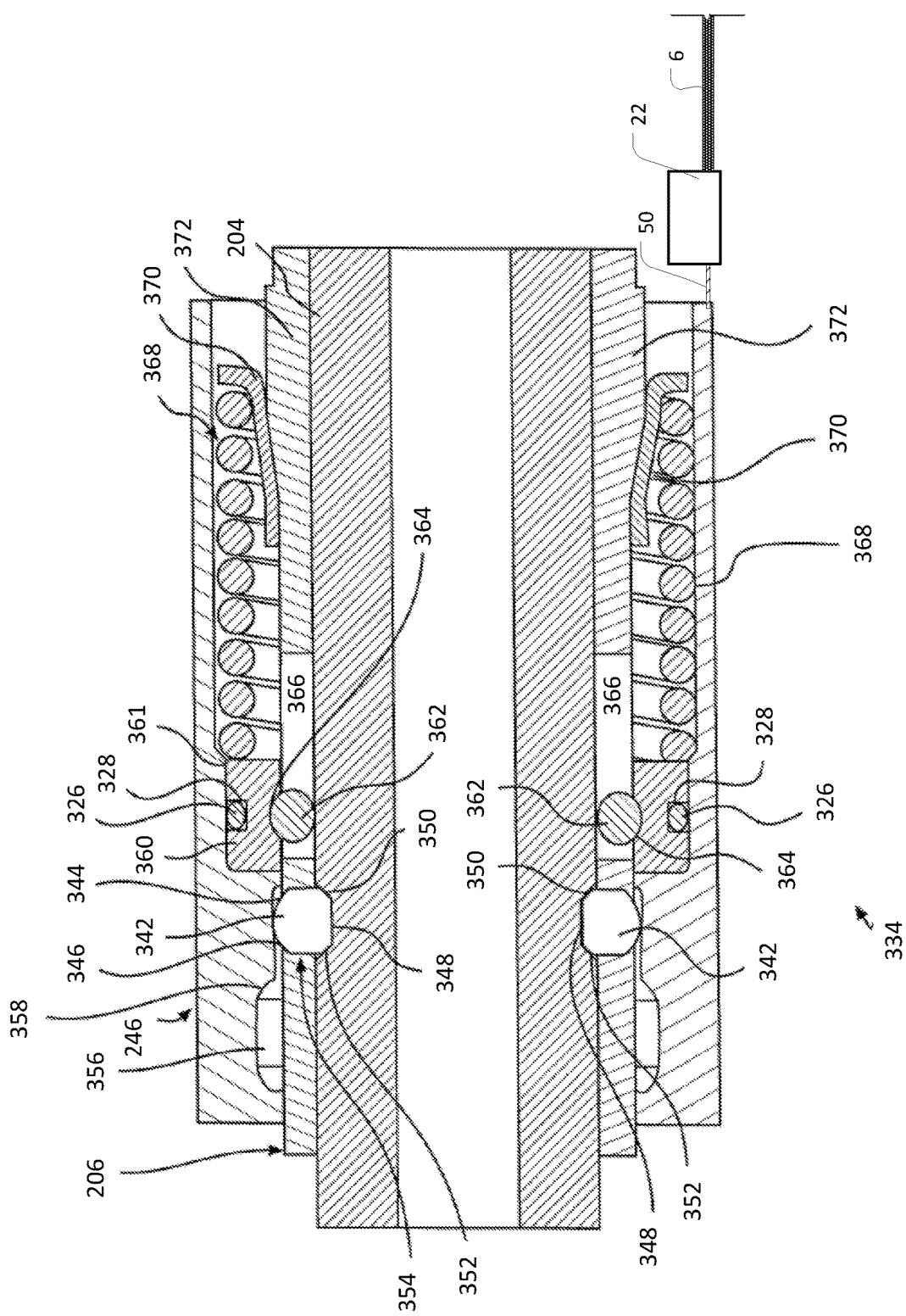
FIG. 7 is a cross-sectional view of a portion of the exemplary hold open rod in accordance with an aspect of the disclosure.

FIG. 7 is a cross-sectional view of a portion of the exemplary hold open rod in accordance with an aspect of the disclosure.

FIG. 7 illustrates a lock mechanism 334, which locks the inner tube 204 with the outer tube 206. While the lock mechanism 334 is described in some detail, it will be understood by one of ordinary skill in the art that various aspects of the disclosure can use various lock mechanisms for implementation of the lock mechanism 334. The lock mechanism 334 shown is meant to be an exemplary lock mechanism and does not limit the disclosure in anyway. Furthermore, it should be noted that in some aspects the lock mechanism 334 is not an essential part of the disclosure but is merely an incidental feature of the hold open rod 202.

As shown in FIG. 7, the hold open rod 202 includes an outer tube 206. The outer tube 206 may be swaged. Other aspects may include a lock body, which is threaded into the outer tube 206 for performing the locking function. On an outer diameter of the swaged portion of the outer tube 206 on the lock mechanism 334, there may be an outer collar assembly 246, which may be spring-loaded. The outer collar assembly 246 may house the locking dogs 342 and retains the locking dogs 342 radially against an outside diameter of the inner tube 204 while the hold open rod 202 is in the retracted or stowed position.

The locking dog 342 may include a chamfered edge 344 and a chamfered edge 346. A locking slot 348 may also include a chamfered edge 350 and a chamfered edge 352. The chamfered edges 344, 346, 350 and 352 may aid in assisting the locking dog 342 moving in and out of the locking slot 348.

As shown in FIG. 7, the outer collar assembly 246 is in a position that prevents the locking dog 342 from exiting the locking slot 348. Thus, the inner tube 204 and the outer tube 206 are locked together. However, if the outer collar assembly 246 is moved toward the right with respect to the orientation shown in FIG. 7, an opening 356 in the outer collar assembly 246 will be exposed to the locking dog 342 allowing the locking dog 342 to move out radially and into the opening 356. Such a move by the locking dog 342 will unlock the inner tube 204 from the outer tube 206.

Movement of the outer collar assembly 246 to the right will cause an isolator 360 contacting the outer collar assembly 246 along a surface 361 to move on a roller or ball bearing 362 located in a ball bearing slot 364 in the isolator 360. The isolator 360 and the ball bearing 362 may move within the ball bearing slot 366 in the outer tube 206 against the urging of a spring 368. The spring 368 may be between the isolator 360 and a spring stop 370 and may exert a force on both. The spring stop 370 may be placed against a thicker part 372 of the outer tube 206. The force of the spring 368 may be overcome by moving the outer collar assembly 246 towards the right by the actuator 22, thereby unlocking the hold open rod 202 by exposing the opening 356 in the outer collar assembly 246 to the locking dogs 342. Exposing the opening 356 may allow the locking dogs 342 to move radially within an opening 354 in the outer tube 206 and out of the locking slot 348 and into the opening 356. Furthermore, movement of the outer collar assembly 246 back toward the left causes the locking dog 342 to slide along the edge 344, which may be chamfered, along the chamfered side 358 of the opening 356 causing the locking dog 342 to move back into the locking slot 348. The isolator 360 may include an O-ring groove 328, which contains an O-ring 326.

In other aspects, the hold open rod 202 may be implemented without the outer collar assembly 246 and the locking slot 348. In this regard, the actuator 22 may directly actuate the locking dog 342 to move the locking dog 342 into contact with the inner tube 204 to prevent movement of the inner tube 204 with respect to the outer tube 206.

In other aspects, the hold open rod 202 may be implemented without the outer collar assembly 246 and the actuator 22 may directly actuate the locking dogs 342 to move the locking dog 342 into the locking slot 348 and/or move the locking dog 342 out of the locking slot 348.

In one aspect, the hold open rod 202 and/or the lock mechanism 334 may be implemented consistent with U.S. patent application Ser. No. 14/663,227, filed Mar. 19, 2015 (title—"Pull Then Lift Lock Mechanism") owned by the assignee of the disclosure and incorporated by reference herein in its entirety.

In one aspect, the hold open rod 202 and/or the lock mechanism 334 may be implemented consistent with U.S. patent application Ser. No. 12/857,947, filed Aug. 17, 2010 (title—"Mechanically Dampening Hold Open Rod") owned by the assignee of the disclosure and incorporated by reference herein in its entirety.

In one aspect, the hold open rod 202 and/or the lock mechanism 334 may be implemented consistent with U.S. patent application Ser. No. 13/323,355, filed Dec. 12, 2011 (title—"Carbon Fiber Hold Open Rod") owned by the assignee of the disclosure and incorporated by reference herein in its entirety.

In one aspect, the hold open rod 202 and/or the lock mechanism 334 may be implemented consistent with U.S. patent application Ser. No. 13/314,982, filed Dec. 8, 2011 (title—"Reinforced Plastic Locking Dogs") owned by the assignee of the disclosure and incorporated by reference herein in its entirety.

In one aspect, the hold open rod 202 and/or the lock mechanism 334 may be implemented consistent with U.S. patent application Ser. No. 13/397,320, filed Feb. 15, 2012 (title—"Hold Open Rod Vibration Dampening System") owned by the assignee of the disclosure and incorporated by reference herein in its entirety.

In one aspect, the hold open rod 202 and/or the lock mechanism 334 may be implemented consistent with U.S. patent application Ser. No. 13/345,239, filed Jan. 6, 2012 (title—"Internal Locking Mechanism For A Hold Open Rod") owned by the assignee of the disclosure and incorporated by reference herein in its entirety.

The electronic release system 2, the actuator 22, the first controller 38, the second controller 28, and/or any other component of the disclosure may include Built-in test equipment (BITE). The Built-in test equipment (BITE) may be configured to address fault management and include diagnostic equipment built into airborne systems to support maintenance processes. The Built-in test equipment (BITE) may include sensors, multimeters, oscilloscopes, discharge probes, frequency generators, the one or more sensors 30, the one or more sensors 44, and the like to enable testing and perform diagnostics. The Built-in test equipment (BITE) may include the detection of the fault, the accommodation of the fault (how the system actively responds to the fault), the annunciation or logging of the fault to warn of possible effects and/or aid in troubleshooting the faulty equipment, or the like.

Accordingly, the disclosure has disclosed an electronic release system for a hold open rod mechanism that may be remotely operated for unlocking a hold open rod mechanism. The disclosure has also disclosed an electronic release system for a latch mechanism for remotely operating a latch mechanism. The disclosed electronic release system for a hold open rod mechanism makes it easier for personnel to reach and operate the unlocking mechanism. The disclosed electronic release system for a hold open rod mechanism prevents the need to mount a ladder or other structure to reach the unlocking mechanism. The disclosed electronic release system for a hold open rod mechanism is safer. The disclosed electronic release system for a hold open rod mechanism reduces the time needed for operating the unlocking mechanism to place the component in the closed position.

Aspects of the disclosure may be implemented in any type of computing devices, such as, e.g., a logical circuit, a processor, a microprocessor, a computer, and the like, with wired/wireless communications capabilities via communication channels.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An electronic release system configured to unlock a hold open rod mechanism configured to support a component or unlock a latch mechanism configured to latch a component, the electronic release system comprising:
   an actuator interface configured with an input device;
   an actuator being associated with a hold open rod mechanism supporting a component or a latch mechanism of a component;
   the input device configured to be actuated by a user to initiate operation of an unlocking mechanism associated with the hold open rod mechanism or the latch mechanism;
   a wiring assembly configured to connect the actuator interface to the actuator;
   the actuator interface configured to receive actuation of the input device, generate an electrical signal, and transmit the electrical signal to the actuator over the wiring assembly;
   the actuator being configured to receive the electrical signal over the wiring assembly operate the unlocking mechanism in response to receiving the electrical signal over the wiring assembly to unlock the hold open rod mechanism or unlock the latch mechanism;
   the actuator comprising at least one of the following: a motor configured to operate the unlocking mechanism to unlock the hold open rod mechanism or unlock the latch mechanism or a solenoid configured to operate the unlocking mechanism to unlock the hold open rod mechanism or unlock the latch mechanism; and
   a linkage connecting the actuator to the unlocking mechanism, the linkage being responsive to the actuator to operate the unlocking mechanism associated with the hold open rod mechanism or the latch mechanism;
   wherein the actuator interface is arranged at a first elevation to be actuated by the user to initiate operation of the unlocking mechanism associated with the hold open rod mechanism or the latch mechanism;
   wherein the unlocking mechanism associated with the hold open rod mechanism or the latch mechanism is arranged at a second elevation with the hold open rod mechanism that supports the component or the latch mechanism that latches the component; and wherein the second elevation is vertically higher than the first elevation; and wherein the linkage comprises at least one of the following: a gear configured to transmit motion of the actuator to the unlocking mechanism, a lever configured to transmit motion of the actuator to the unlocking mechanism, a gear train configured to transmit motion of the actuator to the unlocking mechanism, and a cable configured to transmit motion of the actuator to the unlocking mechanism.

2. The electronic release system according to claim 1 further comprising:

a linkage connecting the actuator to the unlocking mechanism, the linkage being responsive to the actuator to operate the unlocking mechanism associated with the hold open rod mechanism or the latch mechanism, wherein the actuator comprises the solenoid; and wherein the linkage comprises at least one of the following: a gear configured to transmit motion of the solenoid to the unlocking mechanism, a lever configured to transmit motion of the solenoid to the unlocking mechanism, a gear train configured to transmit motion of the solenoid to the unlocking mechanism, and a cable configured to transmit motion of the solenoid to the unlocking mechanism.

3. An electronic release system configured to unlock a hold open rod mechanism configured to support a component or unlock a latch mechanism configured to latch a component, the electronic release system comprising:

an actuator interface configured with an input device;

an actuator being associated with a hold open rod mechanism supporting a component or a latch mechanism of a component;

the input device configured to be actuated by a user to initiate operation of an unlocking mechanism associated with the hold open rod mechanism or the latch mechanism;

a wiring assembly configured to connect the actuator interface to the actuator;

the actuator interface configured to receive actuation of the input device, generate an electrical signal, and transmit the electrical signal to the actuator over the wiring assembly;

the actuator being configured to receive the electrical signal over the wiring assembly operate the unlocking mechanism in response to receiving the electrical signal over the wiring assembly to unlock the hold open rod mechanism or unlock the latch mechanism;

the actuator comprising at least one of the following: a motor configured to operate the unlocking mechanism to unlock the hold open rod mechanism or unlock the latch mechanism or a solenoid configured to operate the unlocking mechanism to unlock the hold open rod mechanism or unlock the latch mechanism;

an output device configured to output a status of at least one of the following: the motor, the solenoid, the hold open rod mechanism, or the latch mechanism; and at least one sensor configured to sense a position of at least one of the following:

the motor, the solenoid, the hold open rod mechanism, or the latch mechanism.

4. The electronic release system according to claim 1 further comprising:

a housing configured to house the actuator; and a housing configured to house the actuator interface.

5. An electronic release system configured to unlock a hold open rod mechanism configured to support a component or unlock a latch mechanism configured to latch a component, the electronic release system comprising:

an actuator interface configured with an input device;

an actuator being associated with a hold open rod mechanism supporting a component or a latch mechanism of a component;

the input device configured to be actuated by a user to initiate operation of an unlocking mechanism associated with the hold open rod mechanism or the latch mechanism;

a wiring assembly configured to connect the actuator interface to the actuator;

the actuator interface configured to receive actuation of the input device, generate an electrical signal, and transmit the electrical signal to the actuator over the wiring assembly;

the actuator being configured to receive the electrical signal over the wiring assembly operate the unlocking mechanism in response to receiving the electrical signal over the wiring assembly to unlock the hold open rod mechanism or unlock the latch mechanism; and the actuator comprising at least one of the following: a motor configured to operate the unlocking mechanism to unlock the hold open rod mechanism or unlock the latch mechanism or a solenoid configured to operate the unlocking mechanism to unlock the hold open rod mechanism or unlock the latch mechanism wherein the actuator further comprises a transmission to amplify a force/torque of the actuator to operate the unlocking mechanism associated with the hold open rod mechanism or the latch mechanism, and wherein the transmission comprises at least one of the following: a leadscrew configured to amplify the force/torque of the actuator to operate the unlocking mechanism associated with the hold open rod mechanism or the latch mechanism, a screw jack configured to amplify the force/torque of the actuator to operate the unlocking mechanism associated with the hold open rod mechanism or the latch mechanism, a ball screw configured to amplify the force/torque of the actuator to operate the unlocking mechanism associated with the hold open rod mechanism or the latch mechanism, and a roller screw configured to amplify the force/torque of the actuator to operate the unlocking mechanism associated with the hold open rod mechanism or the latch mechanism.

6. The electronic release system according to claim 1 wherein the actuator further comprises a transmission to amplify a force/torque of the actuator to operate the unlocking mechanism associated with the hold open rod mechanism or the latch mechanism, wherein the transmission comprises an impacting mechanism configured to amplify the force/torque of the actuator to operate the unlocking mechanism associated with the hold open rod mechanism or the latch mechanism.

7. An aircraft system comprising the electronic release system according to claim 1 and the hold open rod mechanism, the hold open rod mechanism comprising:

an inner tube assembly coupled to an outer tube assembly, wherein the hold open rod mechanism is configured such that after operation of the unlocking mechanism the inner tube assembly is movable within the outer tube assembly.

8. The aircraft system of claim 7 implemented with the hold open rod mechanism further comprising:
- a collar having a lock groove and unlock groove; and
- a locking dog configured to engage the unlock groove when the hold open rod mechanism is in an unlocked configuration and the locking dog further configured to engage the lock groove when the hold open rod mechanism is in a locked configuration.

9. A movable aircraft structure comprising the hold open rod mechanism of claim 7.

10. An electronic release system configured to unlock a hold open rod mechanism configured to support a component or unlock a latch mechanism configured to latch a component, the electronic release system comprising:
- an actuator interface configured with an input device;
- an actuator being associated with the hold open rod mechanism supporting a component or the latch mechanism of a component;
- the input device configured to be actuated by a user to initiate operation of an unlocking mechanism associated with the hold open rod mechanism or the latch mechanism;
- a wiring assembly configured to connect the actuator interface to the actuator;
- the actuator interface configured to receive actuation of the input device, generate an electrical signal, and transmit the electrical signal to the actuator over the wiring assembly;
- the actuator being configured to receive the electrical signal over the wiring assembly operate the unlocking mechanism in response to receiving the electrical signal over the wiring assembly to unlock the hold open rod mechanism or the latch mechanism;
- the actuator comprising at least one of the following: a motor configured to operate the unlocking mechanism to unlock the hold open rod mechanism or unlock the latch mechanism or a solenoid configured to operate the unlocking mechanism to unlock the hold open rod mechanism or unlock the latch mechanism; and
- at least one sensor configured to sense a position of at least one of the following: the motor, the solenoid, the hold open rod mechanism, or the latch mechanism.

11. The electronic release system according to claim 10 further comprising:
- a linkage connecting the actuator to the unlocking mechanism, the linkage being responsive to the actuator to operate the unlocking mechanism associated with the hold open rod mechanism or the latch mechanism,
- wherein the actuator comprises the solenoid; and
- wherein the linkage comprises at least one of the following: a gear configured to transmit motion of the solenoid to the unlocking mechanism, a lever configured to transmit motion of the solenoid to the unlocking mechanism, a gear train configured to transmit motion of the solenoid to the unlocking mechanism, and a cable configured to transmit motion of the solenoid to the unlocking mechanism.

12. The electronic release system according to claim 10 further comprising:
- an output device configured to output a status of at least one of the following: the motor, the solenoid, the hold open rod mechanism, or the latch mechanism.

13. The electronic release system according to claim 10 further comprising:
- a housing configured to house the actuator; and
- a housing configured to house the actuator interface.

14. The electronic release system according to claim 10 further comprising:
- a linkage connecting the actuator to the unlocking mechanism, the linkage being responsive to the actuator to operate the unlocking mechanism associated with the hold open rod mechanism or the latch mechanism;
- wherein the actuator interface is arranged at a first elevation to be actuated by the user to initiate operation of the unlocking mechanism associated with the hold open rod mechanism or the latch mechanism;
- wherein the unlocking mechanism associated with the hold open rod mechanism or the latch mechanism is arranged at a second elevation with the hold open rod mechanism that supports the component or the latch mechanism that latches the component; and
- wherein the second elevation is vertically higher than the first elevation.

15. The electronic release system according to claim 10 wherein the actuator further comprises a transmission to amplify a force/torque of the actuator to operate the unlocking mechanism associated with the hold open rod mechanism or the latch mechanism,
- wherein the transmission comprises at least one of the following: a leadscrew configured to amplify the force/torque of the actuator to operate the unlocking mechanism associated with the hold open rod mechanism or the latch mechanism, a screw jack configured to amplify the force/torque of the actuator to operate the unlocking mechanism associated with the hold open rod mechanism or the latch mechanism, a ball screw configured to amplify the force/torque of the actuator to operate the unlocking mechanism associated with the hold open rod mechanism or the latch mechanism, and a roller screw configured to amplify the force/torque of the actuator to operate the unlocking mechanism associated with the hold open rod mechanism or the latch mechanism.

16. The electronic release system according to claim 10 wherein the actuator further comprises a transmission to amplify a force/torque of the actuator to operate the unlocking mechanism associated with the hold open rod mechanism or the latch mechanism,
- wherein the transmission comprises an impacting mechanism configured to amplify the force/torque of the actuator to operate the unlocking mechanism associated with the hold open rod mechanism or the latch mechanism.

17. An aircraft system comprising the electronic release system according to claim 10 and the hold open rod mechanism, the hold open rod mechanism comprising:
- an inner tube assembly coupled to an outer tube assembly,
- wherein the hold open rod mechanism is configured such that after operation of the unlocking mechanism the inner tube assembly is movable within the outer tube assembly.

18. The aircraft system of claim 17 implemented the hold open rod mechanism further comprising:
- a collar having a lock groove and unlock groove; and
- a locking dog configured to engage the unlock groove when the hold open rod mechanism is in an unlocked configuration and the locking dog further configured to engage the lock groove when the hold open rod mechanism is in a locked configuration.

19. A movable aircraft structure comprising the hold open rod mechanism of claim 17.

* * * * *